Oct. 1, 1963
H. T. ORR
3,105,666
VEHICULAR MOUNTED CARRIER
Filed June 6, 1960
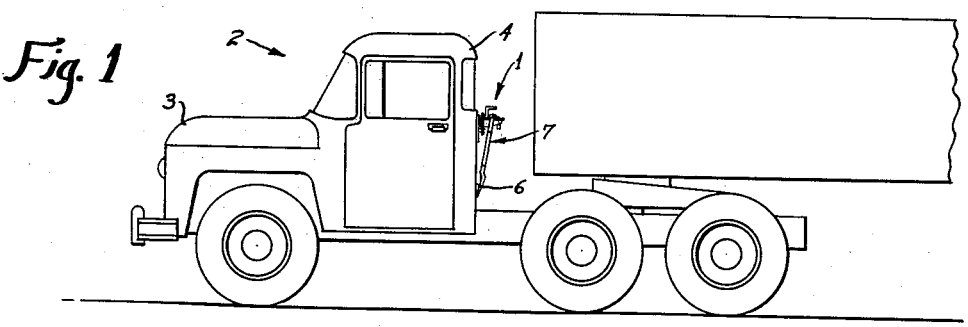
Fig. 1
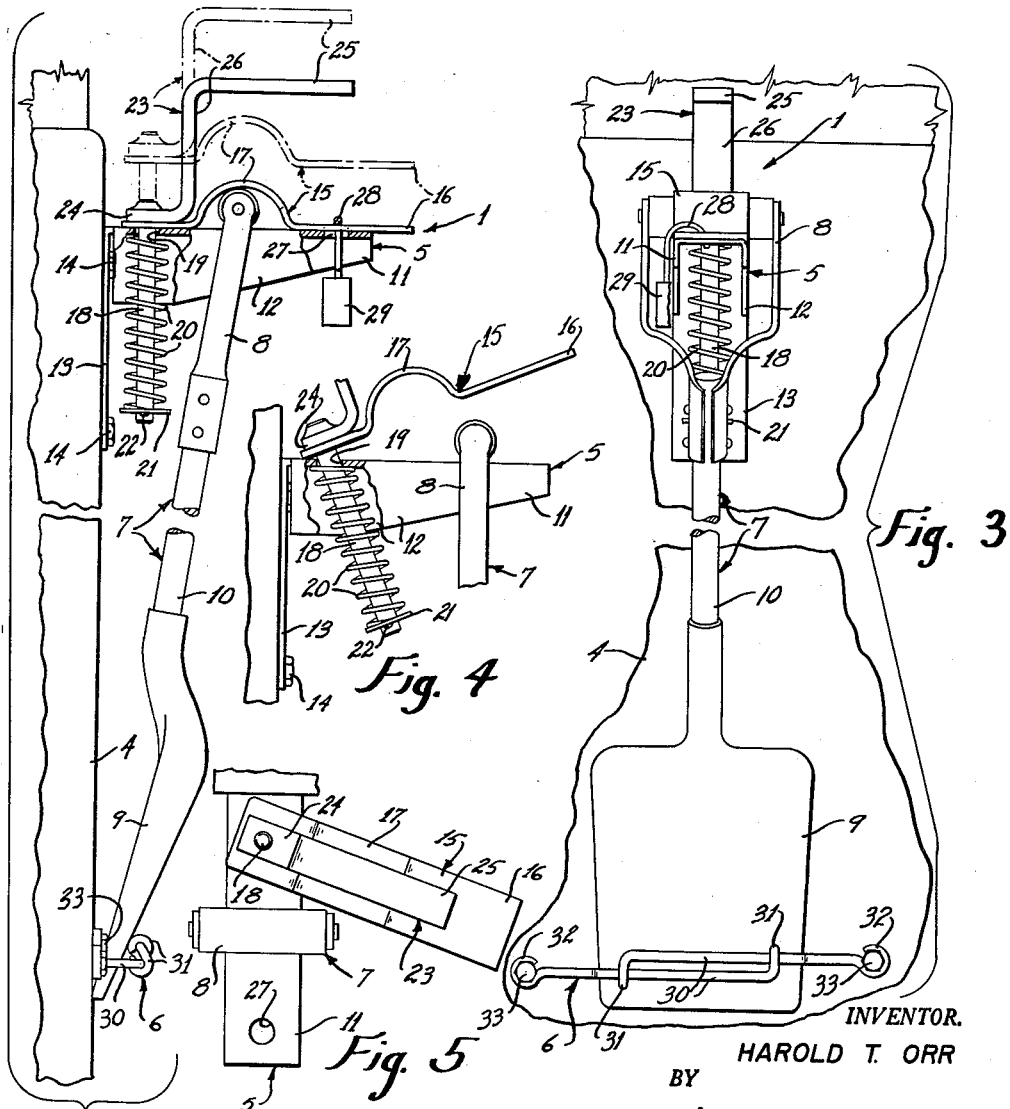
INVENTOR.
HAROLD T. ORR
BY
Andrus & Starke
Attorneys

United States Patent Office 3,105,666
Patented Oct. 1, 1963

3,105,666
VEHICULAR MOUNTED CARRIER
Harold T. Orr, 10315 W. Greenfield Ave.,
Milwaukee 14, Wis.
Filed June 6, 1960, Ser. No. 34,232
7 Claims. (Cl. 248—201)

The present invention relates generally to a vehicular mounted carrier for implements and particularly relates to a carrier adapted to firmly hold a shovel or the like.

There are many truck drivers, as well as drivers of other vehicles, who find it expedient or necessary to carry special purpose implements with their vehicle for incidental usage in the ordinary course of their operations. For example, many truckers, and particularly those engaging in long distance hauling in areas of frequent and heavy snows, prefer to carry a shovel for emergency use such as in freeing or extricating their vehicle should the latter become stuck. This is particularly important because a stalled truck can be the cause of serious highway accidents. Such an implement, especially with trucks used for purposes of general utility, is also desirable for loading and unloading the truck and/or for periodic cleaning of the cargo compartment thereof.

It is known, however, that the carrying of an implement such as a shovel or any similar implement having an appreciable length, constitutes a considerable problem as ordinarily there is no convenient, secure place on or in the vehicle to receive or hold this general type of implement.

Generally, the cab of the truck is too small to conveniently hold such an implement without obstructing or interfering with the safe operation of the vehicle. In addition, if laid loosely in the truck cab, the implement bounces and rattles, presenting further hindrance and discomfort to the driver.

Similar objections as to the rattling of the implement may be made to the carrying of the implement in the rear or cargo compartment of the truck if there is no special support for the implement. This location may prove further objectionable, particularly in the case of truck-trailers, in that the cargo contained in the trailer may be positioned to block access to the implement. There is the further probability that the implement may be left behind upon switching of the trailer if located in the latter.

It is known also that such implements tend to become lost, either through misplacement or theft, due to the manner in which they are presently carried on the vehicle.

Accordingly, it is an object of the present invention to provide a carrier adapted particularly for mounting on a vehicle in any suitable and accessible location thereon and which is designed to resiliently grip a shovel or the like in a firm, rattle-free manner. The carrier is adapted to be operated with one hand to allow more convenient and safe removal of the implement.

It is a further object of the present invention to provide a carrier which may be locked to prevent theft or accidental dislodgment of the implement from the carrier.

A further object of the invention is to provide a carrier of compact, inexpensive construction and which may be readily mounted to a vehicle without requiring extensive modification of the latter.

These and other objects of the invention will become apparent in the course of the following description and in the drawing furnished herewith illustrating the best mode presently contemplated of carrying out the invention.

In the drawing:

FIGURE 1 is a schematic illustration of a carrier in accordance with the invention as shown mounted on a representative vehicle in supporting relation to a shovel;

FIG. 2 is an enlarged side elevation of the carrier shown in FIGURE 1 with phantom lines showing the opened position to receive or remove an implement therefrom;

FIG. 3 is a front elevation of the carrier shown in FIG. 2;

FIG. 4 is a side elevation of the upper portion of the carrier illustrating an alternative way of opening the jaws; and FIG. 5 is a plan view of the jaws with the upper jaw swung clear of the supported implement.

The carrier 1 is designed for use with vehicles and particularly trucks such as semi-tractors, pickup, panel, dump and the like. For purposes of illustration only, carrier 1 is shown in connection with a semi-tractor 2 having the usual forward cab portion 3 formed with the exterior side and rear panels 4.

With a truck of the general nature shown, carrier 1 is preferably mounted to the rear panel of the cab generally along the driver's side thereof. This location is preferred for reasons of practicality inasmuch as this particular area is ordinarily free of obstruction and is generally of the proper height for accepting a long-handled implement. Furthermore, for purposes of convenience and access, this area is ideal from the driver's viewpoint. The location of the carrier, however, is not critical and, depending on the type of vehicle and the driver's individual preferences, may be mounted in any of a number of other locations.

Referring particularly to FIGS. 1 and 2, the illustrated embodiment of the carrier 1 generally includes a clamp-lock assembly 5 secured to the upper portion of panel 4 and a separate and distinct adjustable guide assembly 6 secured below assembly 5 a distance slightly less than the overall length of the implement to be supported.

The clamp-lock assembly 5 is adapted to support an implement 7 which, for purposes of illustration, is shown as a conventional D-handle shovel having a D-handle 8 and a scoop 9 fitted to opposite ends of a shaft 10.

The illustrated assembly 5 includes a horizontal mounting arm 11 which projects horizontally outwardly from cab panel 4 and includes depending integral arms or sides 12. Arm 11 is adapted to receive the D-handle 8 and the depending sides 12 are tapered as shown in FIG. 2 to allow ready assembly of the shovel 7 onto the arm. An integral mounting plate 13 projects downwardly from arm 11 and is bored to receive suitable mounting bolts 14 which secure the assembly to the desired portion of truck panel 4.

The D-handle 8 of shovel 7 is clamped secured against arm 11 by means of a cooperating plate-like jaw 15 supported at opposite ends on arm 11 in lengthwise relation thereto with the outer end of the jaw extending beyond the corresponding end of the arm to form an operating handle 16. The intermediate portion of jaw 15 is contoured to form an arc or half-moon section 17 which encloses and curvilinearly engages the rounded lateral gripping portion of the D-handle 8 of shovel 7.

The opposite ends of jaw 15 rest on arm 11 for pivotal and vertical movement with respect to arm 11 and shovel 7, as follows. A pivot rod 18 extends vertically downwardly through an opening 19 in the inner end of the jaw. The rod 18 is suitably secured to jaw 15 as hereinafter described. A coil spring 20 is seated coaxially about rod 18 and below arm 11 by a washer 21 supported, in turn, on the rod by a cotter pin 22 inserted through the lower end of the rod. The spring 20 positively biases the jaw 15 downwardly and forces the arc section 17 of the jaw firmly against gripping portion of the D-handle 8 to firmly hold the upper end of shovel 7 in place. The arcuate curvature of the jaw 15 enhances the clamping action of the jaw on the handle 8 and prevents the shovel 7 from rattling or vibrating in the carrier 1.

In the illustrated embodiment of the invention, assembly 5 includes a handle 23 which is secured to jaw 15 and to an upward projection of rod 18 as by welding. The rod 18 is thus secured to jaw 15 to bias the jaw downwardly as previously described.

The illustrated handle 23 is formed of an elongated metal plate having the reversely extending flanges 24 and 25 formed integrally on opposite ends of an intermediate stem 26. Flange 24 is secured to the jaw 15 and rod 18 to thereby connect the handle in place with flange 25 extending above jaw 15 and serving as the gripping portion for the handle 23.

To insert shovel handle 8 in the clamp assembly 5, handle 23 can be lifted against the bias of spring 20 an amount sufficient to permit the shovel handle to be slipped over arm 11. Shovel handle 8 is then slid inwardly on arm 11 generally into alignment with the curved portion of jaw 15. Handle 23 is then released and the spring 20 forces the jaw 15 to drop onto the shovel handle, with the arc section 17 of the jaw 15 tightly clamping the shovel 7 within the clamp assembly 5 in the manner shown in FIGS. 2 and 3.

To remove shovel 7 from the carrier, the handle 23 is again raised and the shovel handle 8 slid off the arm 11. In removing and inserting the shovel, handle 23 can be pivoted about the axis of rod 18 to laterally clear arm 11 adjacent handle 8, as shown in FIG. 5. Handle 23 may then be released and the shovel 7 conveniently and safely lifted off the arm 11 or inserted thereon as desired.

Under some conditions it may be difficult to raise handle 23 in the manner just indicated, or the driver may for some other reason prefer not to open the bracket this way. In such situations, the jaw 15 may be moved directly by lifting or pushing upwardly against the operating handle 16 to thereby pivot the jaw upwardly about its inner end as shown in FIG. 4. Clearance between rod 18 and opening 19 accommodates the necessary corresponding movement of the rod. Here, too, the jaw may be swung laterally of arm 11 as it is lifted. The same procedure may be used to re-insert the implement handle in the bracket.

Of course, the assembly 5 may be constructed with only one of the above operating modes by eliminating the desired handle 23 or 16. Both are shown for purposes of explanation.

For locking the shovel 7 in the carrier 1, the freely engaging outer end portions of jaw 15 and arm 11 are bored as at 27 to receive the yoke 28 of a suitable combination or key lock 29. The lock prevents accidental and/or unauthorized opening of the jaw 15 and eliminates the possibility of loss or theft of the implement.

The illustrated adjustable guide assembly 6 which secures the lower end of shovel 7 in place comprises a pair of identical, interfitting rods 30 connected for sliding movement of each other through looped or ringed ends 31 which are formed integrally with the rods and which receive and support the opposite rod. The free end of each of the rods is bent outwardly in divergent relation to one another and terminates in a looped end 32. Suitable bolts 33 are inserted through these looped ends to thereby secure the guide assembly to the panel. The assembly forms with the panel 4 a slot enclosure to receive and hold the scoop 9 of the shovel 7 against the truck panel 4. The width of the guide assembly 6 is adjusted in accordance with the width of scoop 9 prior to bolting the assembly to the truck, by appropriate sliding adjustment of the rods relatively of each other. The assembly 6 is spaced from clamp assembly 5 such that the scoop 9 is wedged firmly within assembly 6 when the shovel handle 8 moves on to arm 11. The shovel 7 is therefore firmly held in the carrier 1 and cannot vibrate or rattle when the truck 2 is moving.

Assembly 6 can also be replaced with a simple coil spring, not shown, which will resiliently grasp the scoop 9 in the assembled position.

A carrier constructed in accordance with the present invention may be used with practically all types of vehicles and installed in a variety of locations, thus providing a highly convenient and practical solution to the problem of releasably carrying unwieldy implements such as shovels and other implements having a lateral rod-like handle portion on a vehicle. Further, many implements may be readily modified for use with the carrier either by securing a D-type handle on the implement in the case of handle-free implements or if one is present, replacing it with a D-type handle. The clamping elements of the carrier are inexpensive and permit the ready insertion and removal of the implement from the carrier and yet hold the implement in a firm, vibration-free manner.

Various modes of carrying out the present invention are contemplated as being within the scope of the following claims particularly pointing out and distinctly claiming the subject matter regarded as the nature of the invention.

I claim:

1. A support assembly for mounting on a vehicle and adapted to receive a shovel having a handle with a laterally extending handle grip, comprising a support arm for receiving and supporting the handle with the handle grip resting upon the arm, a jaw movably connected to the arm and overlying the handle grip, resilient biasing means secured to the jaw and biasing the jaw into engagement with the handle grip and the arm to tightly grasp the handle grip, and an adjustable guide means adapted to be attached to the vehicle in spaced relation to the arm for holding the shovel portion of said implement against swinging movement when in said support assembly.

2. A carrier adapted for mounting on a vehicle for supporting an implement having a handle fitted to one end of a shaft, comprising a support arm for receiving and supporting the handle of said implement, a resiliently biased jaw connected to said arm near one end thereof for movement relatively to and from said arm and for pivotal movement thereto, and means on said jaw being normally biased towards said arm and adapted to yieldingly grip the handle of said implement between said means and said arm, said arm and jaw engaging freely opposite their connected ends, means for locking said jaw to said arm at said freely engaging ends to thereby lock said implement in said bracket, and a pair of slidably adjustable, interfitting rods adapted to extend around said implement from said handle for holding the implement against swinging movement.

3. The structure of claim 2 wherein one of said jaw and arm is formed outwardly relative to the other of said jaw and arm in an arcuate manner intermediate its ends to define with the other of said jaw and arm a generally circular space to permit improved seating of the implement handle between said arm and jaw.

4. A support assembly for carrying an implement on a vehicle, said implement having an elongated shaft formed at one end with a handle having a rounded grip, a bracket adapted to support said implement on a fixed wall comprising a pair of spring-biased clamp members normally biased together and adapted to receive and support said handle therebetween and connected at one end for movement relatively to and from one another and for free pivoting movement relatively of one another, said clamp members disposed in free engagement opposite their connected ends, with at least one of said members being formed to the curvature of a portion of said handle grip intermediate the ends of said member to permit the said member to curvilinearly engage said handle grip to clamp the latter firmly in the bracket, said members being further provided with overlying openings in their freely engaging ends, locking means extending through said openings for locking said members together to prevent theft of said implement, a handle secured to one of said members and extending outwardly therefrom for facilitating relative movement between said members for inserting and removing the implement from said bracket, and guide means for holding said implement adjacent the end opposite of said handle against swinging movement.

5. A support assembly for carrying an implement on a vehicle, said implement having an elongated shaft formed at one end with a handle having a rounded grip and at the opposite end with a scoop, a bracket adapted to support said implement on a fixed wall comprising a pair of spring-biased cooperating clamp members normally biased to closed position and adapted to receive and hold said handle therebetween, said members connected at one end for movement relatively to and from one another and disposed in free engagement at their opposite ends, at least one of said members being formed to the curvature of a portion of said handle grip intermediate the ends of said member to curvilinearly engage said grip and hold the same between said clamp members in a firm, rattle-free manner, said members being further provided with overlying openings in their freely engaging ends to receive locking means to prevent theft of said implement, and an adjustable guide assembly formed of a pair of slidable, interfitting rods adapted to form with said wall an enclosure and adapted to receive and hold the scooped end of said implement.

6. A support for mounting on a vehicle and adapted to support an implement having a handle formed with a rounded grip and a scoop fitted to opposite ends of a shaft, comprising a horizontal support arm adapted to be secured to a vehicle and to extend outwardly therefrom to accept and support said implement handle, a jaw disposed lengthwise on said arm and projecting longitudinally from said arm at the outer end thereof, the intermediate portion of said jaw being arched upwardly and cooperating with said arm to form a socket for receiving the rounded grip of said implement handle, a rod-like member secured to the inner end of said jaw and extending downwardly through an aligned opening in said arm, said opening being larger than the rod-like member, a coil spring mounted on the rod-like member and acting between the arm and the outer end of the rod-like member to continuously bias the jaw into engagement with said arm, aligned openings in the outer end of said arm and the outer end portion of said jaw for receiving locking means, and guide means adapted to be secured to the vehicle below said support arm generally slightly less than the length of said implement for receiving the scoop thereof and for firmly containing the implement against swinging movement relatively of the support.

7. A carrier for mounting on a vehicle and adapted to support an implement having a long shaft formed with a D-handle at one end and a scoop at the opposite end, comprising a first horizontal jaw secured at one end to said vehicle and extending outwardly therefrom, a second jaw extending lengthwise along said first jaw and forming with said first jaw a gripping opening to accept and support the D-handle of said implement, said second jaw extending longitudinally beyond the outer end of said first jaw, means for resiliently connecting said jaws at their inner ends for vertical and for horizontal pivoting movement relatively of one another and for resilienlty clamping said D-handle firmly between said jaws and within said gripping opening, aligned openings in the outer end portions of said jaws, locking means extending through said openings for locking said jaws together, a handle secured to one of said jaws and having a free end disposed in the plane of said jaw in vertically spaced relation thereto, said jaws being movable of one another selectively by said handle and by the outer end of said second jaw, and guide means adapted to be secured to the vehicle below said jaws for containing the scoop end of said implement against swinging movement.

References Cited in the file of this patent

UNITED STATES PATENTS

| | | |
|---|---|---|
| 1,011,594 | Dunham | Dec. 12, 1911 |
| 1,505,396 | Lees | Aug. 19, 1924 |
| 1,816,334 | Matthews | July 28, 1931 |
| 2,316,290 | Schenbeck | Apr. 13, 1943 |
| 2,792,581 | Woyton | May 21, 1957 |
| 2,919,058 | Thompson | Dec. 29, 1959 |